(12) United States Patent
Kuo et al.

(10) Patent No.: US 8,444,099 B1
(45) Date of Patent: May 21, 2013

(54) BACK PLATE OF LIQUID CRYSTAL DISPLAY MODULE AND SPLICE STRUCTURE THEREOF

(75) Inventors: Yicheng Kuo, Shenzhen (CN); Yu-chun Hsiao, Shenzhen (CN); Chong Huang, Shenzhen (CN); Jiahe Cheng, Shenzhen (CN); Chengwen Que, Shenzhen (CN); Quan Li, Shenzhen (CN); Liu-yang Yang, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 0 days.

(21) Appl. No.: 13/379,991

(22) PCT Filed: Nov. 25, 2011

(86) PCT No.: PCT/CN2011/082911
§ 371 (c)(1),
(2), (4) Date: Dec. 21, 2011

(51) Int. Cl.
| | |
|---|---|
| A47B 96/06 | (2006.01) |
| A47G 29/00 | (2006.01) |
| A47K 1/00 | (2006.01) |
| E04G 3/00 | (2006.01) |
| E04G 5/06 | (2006.01) |
| F21V 21/00 | (2006.01) |
| F21V 35/00 | (2006.01) |
| A47B 96/00 | (2006.01) |
| A47K 5/00 | (2006.01) |
| F16L 3/08 | (2006.01) |
| G02F 1/1335 | (2006.01) |
| H05K 5/00 | (2006.01) |
| H04N 5/66 | (2006.01) |
| H04N 9/12 | (2006.01) |
| G09F 13/04 | (2006.01) |
| G09F 13/08 | (2006.01) |

(52) U.S. Cl.
USPC .............. 248/220.22; 248/224.8; 248/220.21; 349/58; 349/59; 349/60; 361/679.01; 348/739; 362/97.3

(58) Field of Classification Search
USPC ............. 248/220.21, 220.22, 225.11, 223.41; 349/58–60; 361/679.01, 679.02, 679.09, 361/679.21, 679.22, 679.26, 679.27, 683, 361/681, 682, 679.3, 679.04–679.07; 312/223.1–223.2; 24/68, 342, 679, 683; 40/606.01, 607.01, 611.12, 613.13, 607.15, 40/466, 477
See application file for complete search history.

(56) References Cited

U.S. PATENT DOCUMENTS

2009/0172985 A1 * 7/2009 Meeker et al. ............. 40/606.09
2010/0165236 A1 * 7/2010 Bae et al. ........................ 349/58

* cited by examiner

*Primary Examiner* — Joshua J Michener
*Assistant Examiner* — Muhammad Ijaz

(57) ABSTRACT

The present invention discloses a back plate of a liquid crystal display (LCD) module and a splice structure thereof. The back plate is assembled at least by a first back plate portion and a second back plate portion, wherein at least one splice structure is defined between the first back plate portion and the second back plate portion, and the shapes of two sides of the splice structure are correspondingly engaged with each other. Besides, the convex portion is provided with a fixing hole thereon, and the concave step portion is correspondingly provided with a fixing pillar therein. The fixing pillar passes through the fixing hole to fix the first back plate portion and the second back plate portion. The present invention can use different type of material to assemble into the back plate, so as to intensify the splicing strength except for decreasing the material cost.

14 Claims, 10 Drawing Sheets

BACK PLATE OF LIQUID CRYSTAL DISPLAY MODULE AND SPLICE STRUCTURE THEREOF

FIELD OF THE INVENTION

The present invention relates to a back plate of a liquid crystal display (LCD) module, and more particularly to a splice structure of a back plate of an LCD module.

BACKGROUND OF THE INVENTION

A liquid crystal display (LCD) is a kind of flat panel display (FPD) which displays images by the property of the liquid crystal material. In comparison with other display devices, the LCD has the advantages in lightweight, compactness, low driving voltage and low power consumption, and thus has already become the mainstream product in the whole consumer market. However, the liquid crystal material of the LCD cannot emit light by itself, and must depend upon an external light source. Thus, the LCD further has a backlight module to provide the needed light source.

An assembly of a traditional LCD module is mainly to load a light guide plate into a back plate, wherein the light guide plate is provided with an optical film assembly, and then a plastic frame covers on outer edges of the back plate to fix the optical film set and the light guide plate, from top to bottom, so as to assemble a back light module. Moreover, an LCD panel is stacked on the back light module, and then a housing covers and fixes the LCD panel and the back light module to assemble an LCD module.

Referring now to FIG. 1, a front view of a back face of a back plate of a traditional LCD module is illustrated in FIG. 1. As shown in FIG. 1, aluminum or zinc-plated steel plate is generally used to be material of an LCD module, and is processed to be an integral back plate by punching. The aluminum has a better effect of heat-dissipation, so that it is advantageous to increase the life time of a product; and heat-dissipation effect of the zinc-plated steel plate is worse, but the price is relatively low. In a cost of the back plate, the cost of the back plate material occupies the greatest ratio, especially for a large size LCD module (such as 46 inches or larger). If the entire back plate uses the aluminum material, the cost is too high, and the structure strength is worse; but if the entire back plate uses the zinc-plated steel plate, the heat-dissipation is worse and the performance of product will be lowered. Hence, how to ensure the product quality and save the material cost to lower the whole product cost has become an important subject matter of research.

As a result, it is necessary to provide a back plate of an LCD module and a splice structure thereof to solve the problems existing in the conventional technologies.

SUMMARY OF THE INVENTION

A primary object of the present invention is to provide a splice structure of a back plate of a liquid crystal display (LCD) module, wherein through at least one splice structure defined between a first back plate portion and a second back plate portion, the shapes of two side edges are correspondingly engaged with each other. Besides, the convex portion is provided with a fixing hole thereon, and the concave step portion is correspondingly provided with a fixing pillar therein. The fixing pillar passes through the fixing hole for a distance, and an end portion of the fixing pillar is deformed and expanded in diameter thereof to fix the fixing hole by an external force, so as to fix the first back plate portion and the second back plate portion.

A secondary object of the present invention is to provide a back plate of an LCD module, wherein different type of material and separation modes are used to assemble into the back plate of an LCD module.

To achieve the above object, the present invention provides a splice structure of a back plate of a liquid LCD module, characterized in that: the back plate of the LCD module is assembled at least by a first back plate portion and a second back plate portion, wherein at least one splice structure is defined between the first back plate portion and the second back plate portion, and the splice structure comprises a first side edge formed on the first back plate portion, and a second side edge formed on the second back plate portion; and the first side edge is provided with at least one convex portion, and the second side edge is provided with at least one concave step portion, which does not pass through the second back plate portion, and shapes of the first side edge and the second side edge are correspondingly engaged with each other;

wherein a maximum width at an outer end of the convex portion is larger than a minimum width at an inner end of the convex portion;

wherein the convex portion is provided with a fixing hole thereon, and the concave step portion is correspondingly provided with a fixing pillar therein; and wherein the fixing pillar passes through the fixing hole for a distance, and after the first back plate portion is spliced with the second back plate portion, an end portion of the fixing pillar is deformed and expanded in diameter thereof to fix the fixing hole by an external force, so as to fix the first back plate portion and the second back plate portion.

In one embodiment of the present invention, the shape of the convex portion and the concave step portion is an arc shape or a trapezoid shape, and the length of the convex portion is substantially equal to the width thereof.

In one embodiment of the present invention, the material of the first back plate portion is zinc-plated steel plate, and the material of the second back plate portion is aluminum or alloy thereof.

In one embodiment of the present invention, the material of the first back plate portion is zinc-plated steel plate, and the material of the second back plate portion is engineering plastic.

In one embodiment of the present invention, the splice structure comprises a plurality of the convex portions and the concave step portions, wherein an arrangement mode of the convex portions is symmetrical or unsymmetrical type.

To achieve the above object, the present invention provides a back plate of an LCD module, characterized in that: the back plate of the LCD module is assembled at least by a first back plate portion and a second back plate portion, wherein at least one splice structure is defined between the first back plate portion and the second back plate portion, and the splice structure comprises a first side edge formed on the first back plate portion, and a second side edge formed on the second back plate portion; and the first side edge is provided with at least one convex portion, and the second side edge is provided with at least one concave step portion, which does not pass through the second back plate portion, and shapes of the first side edge and the second side edge are correspondingly engaged with each other;

wherein a maximum width at an outer end of the convex portion is larger than a minimum width at an inner end of the convex portion;

wherein the convex portion is provided with a fixing hole thereon, and the concave step portion is correspondingly provided with a fixing pillar therein; and wherein the fixing pillar passes through the fixing hole for a distance, and after the first back plate portion splicing with the second back plate portion, an end portion of the fixing pillar is deformed and expanded in diameter thereof to fix the fixing hole by an external force, so as to fix the first back plate portion and the second back plate portion.

In one embodiment of the present invention, the material of the first back plate portion is zinc-plated steel plate, and the material of the second back plate portion is aluminum or alloy thereof.

In one embodiment of the present invention, the material of the first back plate portion is zinc-plated steel plate, and the material of the second back plate portion is engineering plastic.

In one embodiment of the present invention, a splice mode of the back plate of the LCD module is symmetrical or unsymmetrical type.

In one embodiment of the present invention, a splice mode of the back plate of the LCD module is a frame type.

In one embodiment of the present invention, the shape of the convex portion and the concave step portion is an arc shape or a trapezoid shape, and the length of the convex portion is substantially equal to the width thereof.

In one embodiment of the present invention, the material of the first back plate portion is zinc-plated steel plate, and the material of the second back plate portion is aluminum or alloy thereof.

In one embodiment of the present invention, the material of the first back plate portion is zinc-plated steel plate, and the material of the second back plate portion is engineering plastic.

In one embodiment of the present invention, the splice structure comprises a plurality of the convex portions and the concave step portions, wherein an arrangement mode of the convex portions is symmetrical or unsymmetrical type.

By the splice structure, the present invention can use different type of material to assemble into the back plate of the LCD module, so as to intensify the splicing strength except for decreasing the material cost.

DETAILED DESCRIPTION OF THE PREFERRED EMBODIMENTS

The foregoing objects, features and advantages adopted by the present invention can be best understood by referring to the following detailed description of the preferred embodiments and the accompanying drawings.

A back plate of a liquid crystal display (LCD) module according to the present invention is to take apart a back plate of a traditional big size LCD module, namely segment design, and then splices them into a back plate.

Figure 1:
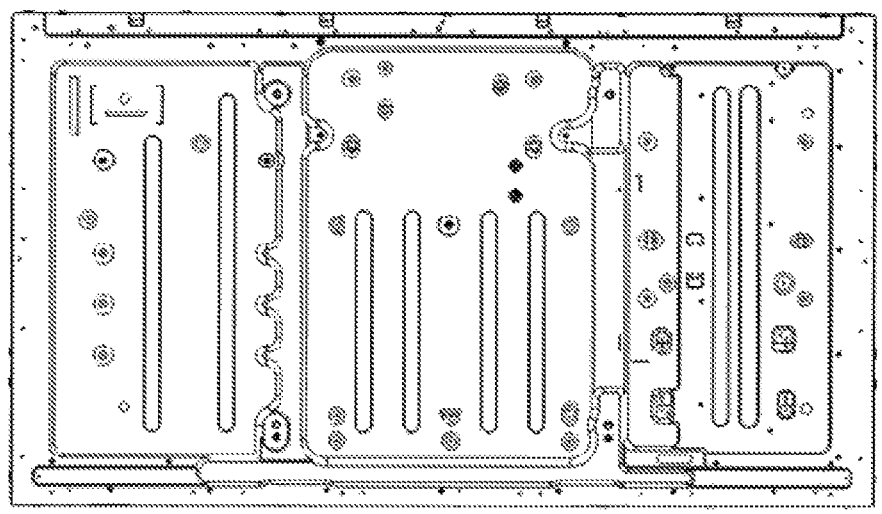
FIG. 1 is a front view of a back face of a back plate of a traditional liquid crystal display (LCD) module.
Figure 2A:
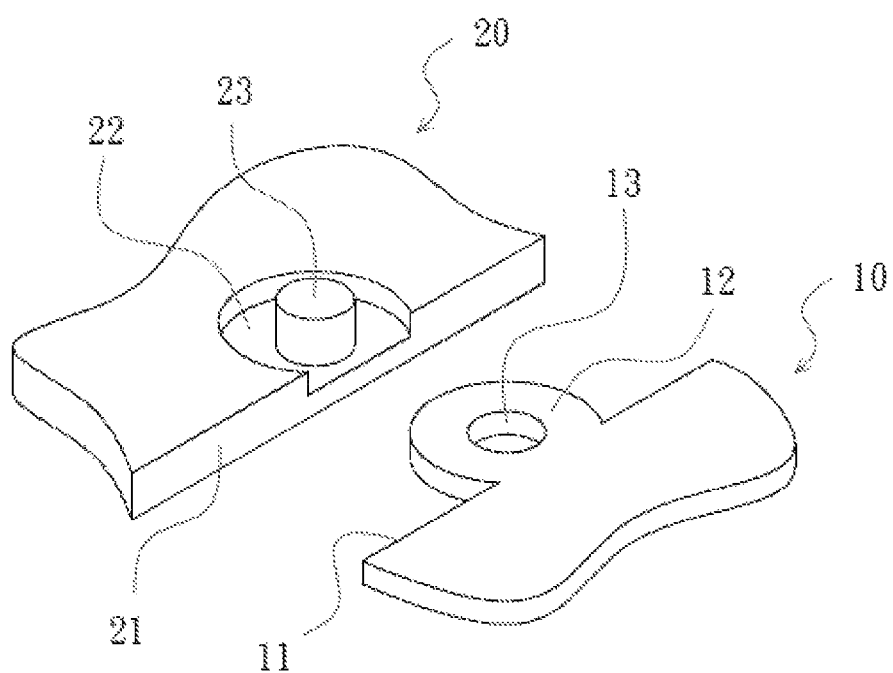
FIG. 2A is a partially perspective view of a splice structure of a back plate of an LCD module according to a first preferred embodiment of the present invention.
Figure 2B:
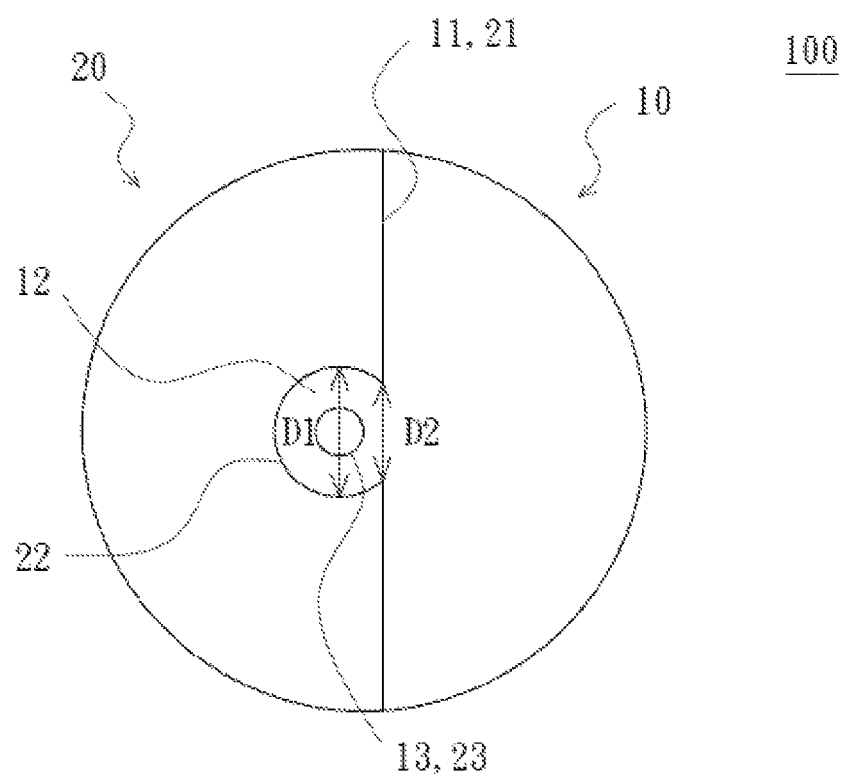
FIG. 2B is a partially front view of the splice structure of the back plate of the LCD module according to the first preferred embodiment of the present invention.

Referring now to FIGS. 2A and 2B, a partially perspective view of a splice structure of a back plate of an LCD module according to a first preferred embodiment of the present invention is illustrated in FIG. 2A; and a partially front view of the splice structure of the back plate of the LCD module according to the first preferred embodiment of the present invention is illustrated in FIG. 2B. A back plate of an LCD module according to the present invention is assembled at least by a first back plate portion 10 and a second back plate portion 20, wherein at least one splice structure 100 is defined between the first back plate portion 10 and the second back plate portion 20. The splice structure 100 comprises a first side edge 11 formed on the first back plate portion 10, and a second side edge 12 formed on the second back plate portion 20, and shapes of the first side edge 11 and the second side edge 12 are correspondingly engaged with each other.

As shown in FIGS. 2A and 2B, the first side edge 11 is provided with at least one convex portion 12, and the second side edge 21 is provided with at least one concave step portion 22. The shapes of the convex portion 12 and the concave step portion 22 are approximately an arc shape, and a maximum width D1 at an outer end of the convex portion 12 is larger than a minimum width D2 at an inner end of the convex portion (FIG. 2B). Besides, the at least one concave step portion 22 does not pass through the second back plate portion. Furthermore, the convex portion 12 is provided with a fixing hole 13 thereon, and the concave step portion 22 is correspondingly provided with a fixing pillar 23 therein.

Figure 2C:
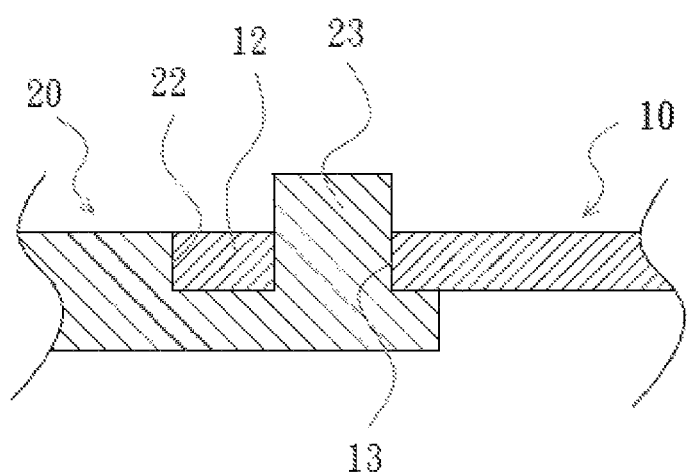
FIG. 2C is a partially cross-sectional view of the splice structure of the back plate of the LCD module according to the first preferred embodiment of the present invention (before fixing)
Figure 2D:
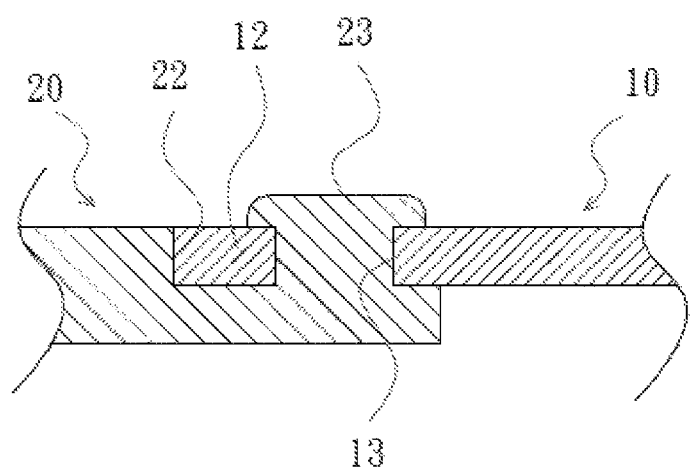
FIG. 2D is a partially cross-sectional view of the splice structure of the back plate of the LCD module according to the first preferred embodiment of the present invention (after fixing)

Referring now to FIGS. 2C and 2D, a partially cross-sectional view of the splice structure of the back plate of the LCD module according to the first preferred embodiment of the present invention (before fixing) is illustrated in FIG. 2C; and a partially cross-sectional view of the splice structure of the back plate of the LCD module according to the first preferred embodiment of the present invention (after fixing) is illustrated in FIG. 2D, As shown in FIGS. 2C and 2D, the fixing pillar 23 passes through the fixing hole 13 for a distance. After the first back plate portion 10 is spliced with the second back plate portion 20, an end portion of the fixing pillar 23 is deformed and expanded in diameter thereof to fix the fixing hole 13 by an external force, so as to fix the first back plate portion 10 and the second back plate portion 20.

As above mentioned, through the shapes of corresponding engagement of the convex portion 12 and the concave step portion 22, the splice structure 100 according to the present invention can assemble the first back plate portion 10 and the second back plate portion 20 in together. Preferably, the material of the first back plate portion 10 is zinc-plated steel plate, and the material of the second back plate portion 20 is aluminum or alloy thereof, so that the end portion of the fixing pillar 23 is deformed by punching of a metal punch head (not shown). Otherwise, the material of the first back plate portion 10 is zinc-plated steel plate, and the material of the second back plate portion 20 is engineering plastic, so that the end portion of the fixing pillar 23 is deformed by a heater (not shown).

Figure 3:
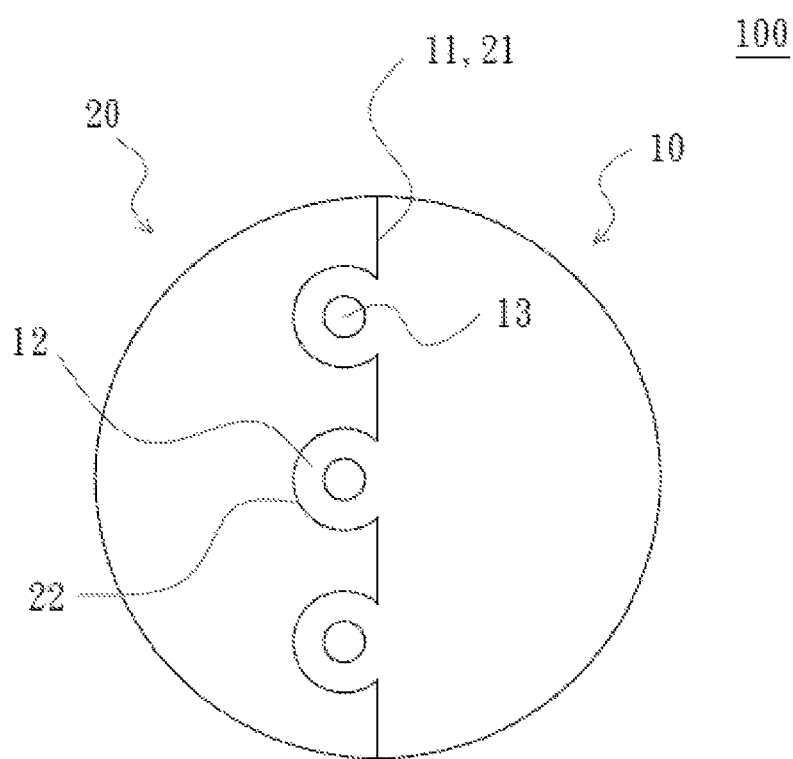
FIG. 3 is a partially front view of a splice structure of a back plate of an LCD module according to a second preferred embodiment of the present invention.

Referring now to FIG. 3, a partially front view of a splice structure of a back plate of an LCD module according to a second preferred embodiment of the present invention is illustrated in FIG. 3. The splice structure 100 of a back plate of an LCD module according to a second preferred embodiment of the present invention is similar to the splice structure 100 of the back plate of the LCD module according to the first preferred embodiment of the present invention, so as to use similar terms and numerals of the foregoing embodiment, the difference of this embodiment is that: the splice structure 100 comprises a plurality of the convex portions 12, wherein an arrangement mode of the convex portions 12 is symmetrical type.

Figure 4:
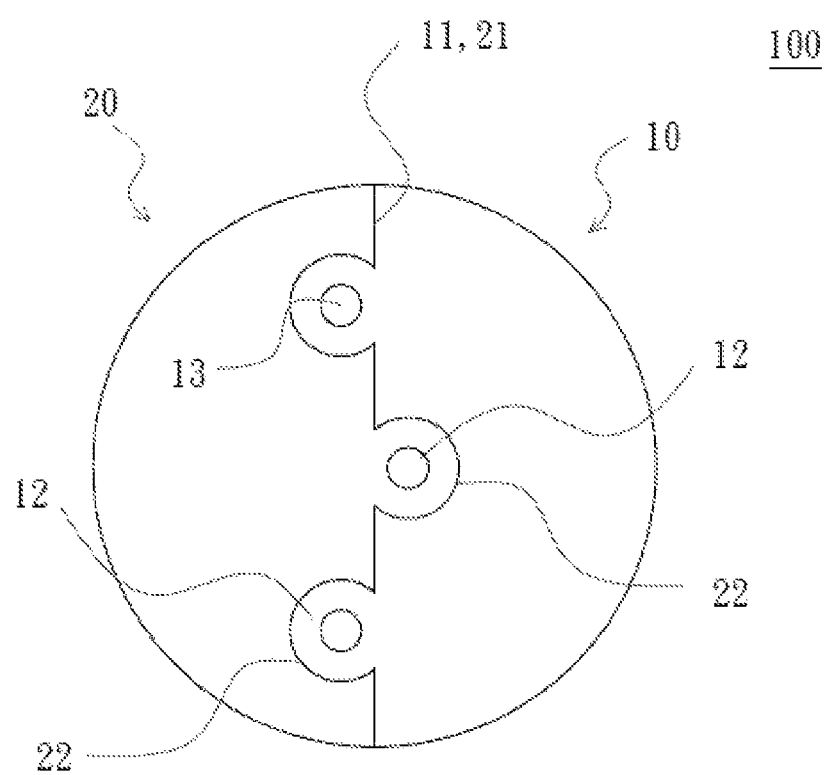
FIG. 4 is a partially front view of a splice structure of a back plate of an LCD module according to a third preferred embodiment of the present invention.

Referring now to FIG. 4, a partially front view of a splice structure of a back plate of an LCD module according to a third preferred embodiment of the present invention is illustrated in FIG. 4. The splice structure 100 of a back plate of an LCD module according to a third preferred embodiment of the present invention is similar to the splice structure 100 of the back plate of the LCD module according to the second preferred embodiment of the present invention, so as to use similar terms and numerals of the foregoing embodiment, the difference of this embodiment is that: an arrangement mode of the convex portions 12 and the concave step portions 22 is unsymmetrical type.

Figure 5:
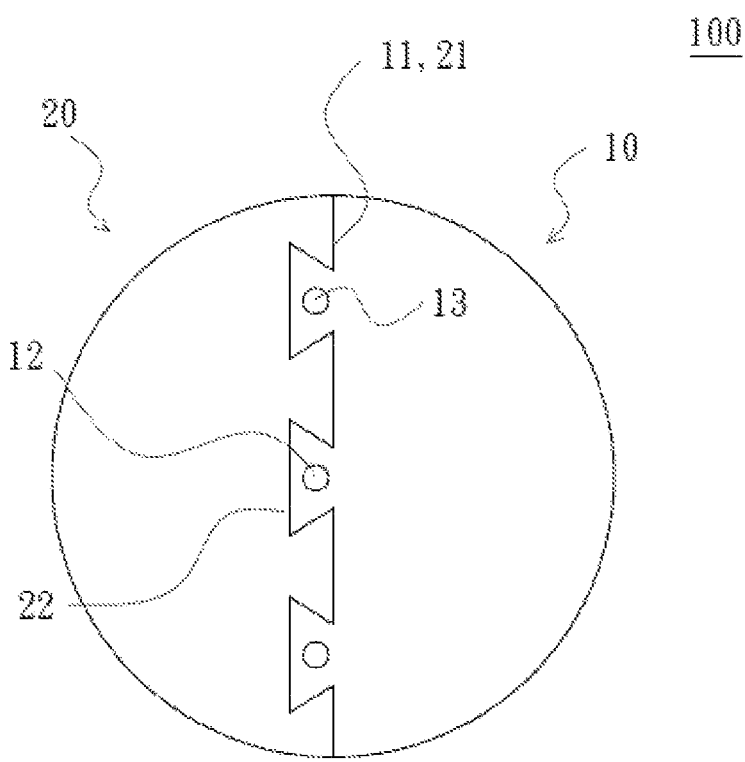
FIG. 5 is a partially front view of a splice structure of a back plate of an LCD module according to a fourth preferred embodiment of the present invention.

Referring now to FIG. 5, a partially front view of a splice structure of a back plate of an LCD module according to a fourth preferred embodiment of the present invention is illustrated in FIG. 5. The splice structure 100 of a back plate of an LCD module according to a fourth preferred embodiment of the present invention is similar to the splice structure 100 of the back plate of the LCD module according to the second preferred embodiment of the present invention, so as to use similar terms and numerals of the foregoing embodiment, the difference of this embodiment is that: the shapes of the convex portion 12 and the concave step portion 22 are changed from an arc shape to a trapezoid shape. Thus, the maximal width at the outer end of the convex portion 12 is still larger than the minimum width at the inner end of the convex portion, so that it makes the convex portion 12 and the concave step portion 22 is tight match.

Furthermore, the arrangement mode of the convex portions 12 and the concave step portions 22 can be equidistant or non-equidistant type except above mentioned symmetrical or unsymmetrical type.

Figure 6A:
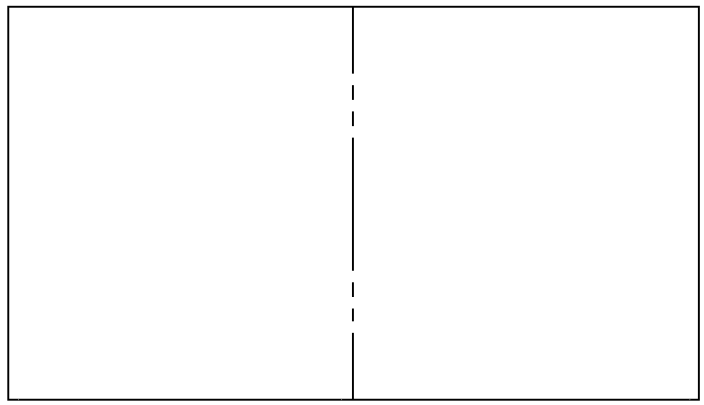
FIGS. 6A to 6D are splicing schematic views of the back plate of the LCD module according to the present invention.
Figure 6B:
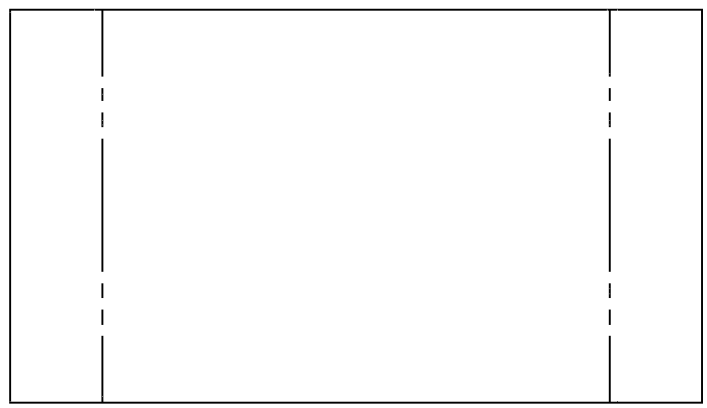
Figure 6C:
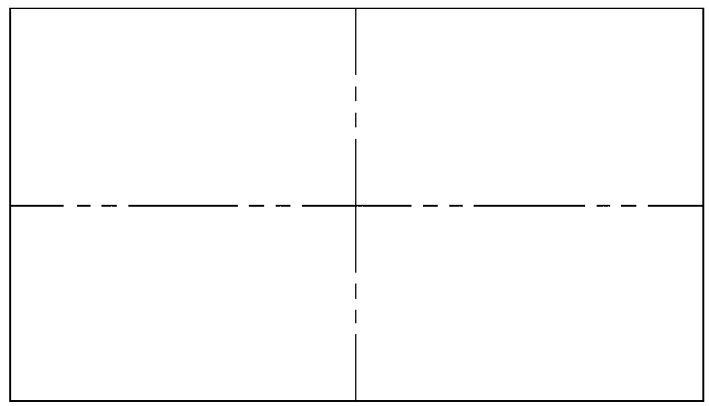
Figure 6D:
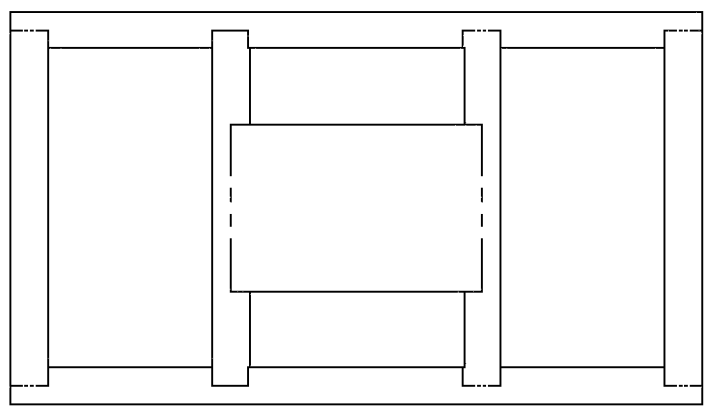

Referring now to FIGS. 6A to 6D, splicing schematic views of the back plate of the LCD module according to the present invention are illustrated in FIGS. 6A to 6D. A back plate of an LCD module according to the present invention is to take apart a back plate of a traditional big size LCD module, namely segment design, and then splices them into a back plate. There are various types of splice modes are shown in FIGS. 2A to 2D and as follows:

In FIG. 6A, a splice mode of equal separating the right side and left side is disclosed;

In FIG. 6B, a splice mode of separating the right side, left side and middle is disclosed;

In FIG. 6C, a splice mode of separating the upside, downside, right side and left side is disclosed; and In FIG. 6D, a splice mode of a frame type is disclosed.

The advantages of the various types of above mentioned splice modes are as follows: the portion installed light emitting diode (LED) light bar is necessary to be dissipated heat, which can use a material of well heat conduction (such as aluminum); and the other portion can use a cheaper material (such as zinc-plated steel plate), so as to lower the cost of material to the lowest. Furthermore, by using of splice and assembly with the same type of material or the different type of material, it can achieve a minimum thickness and a maximum strength, and mold or extra work is unnecessary. Besides, the main part can be further shared to fit back plates into different specifications.

As described above, in comparison with the traditional LCD module that uses aluminum or zinc-plated steel plate as material, and is formed an integral back plate by punching. If the entire back plate uses the aluminum material, the cost is too high, and the structure strength is worse; but if the entire back plate uses the zinc-plated steel plate, the heat-dissipation is worse, and lower the performance of product. A back plate of an LCD module according to the present invention is assembled at least by a least one first back plate portion 10 and a second back plate portion 20, wherein at least one splice structure 100 is defined between the first back plate portion 10 and the second back plate portion 20, and the shapes of two sides of the splice structure 100 are correspondingly engaged with each other. The convex portion 12 is provided with a fixing hole 13 thereon, and the concave step portion 22 is correspondingly provided with a fixing pillar 23 therein. The fixing pillar 23 passes through the fixing hole 13 for a distance, and after the first back plate portion 10 is spliced with the second back plate portion 20, an end portion of the fixing pillar 23 is deformed and expanded in diameter thereof to fix the fixing hole 13 by an external force, so as to fix the first back plate portion 10 and the second back plate portion 20. Through the splice structure 100 that uses different type of material to assemble into the back plate of the LCD module, so as to intensify the splicing strength except for decreasing the material cost The present invention has been described with a preferred embodiment thereof and it is understood that many changes and modifications to the described embodiment can be carried out without departing from the scope and the spirit of the invention that is intended to be limited only by the appended claims.

The invention claimed is:

1. A splice structure of a back plate of a liquid crystal display (LCD) module, characterized in that: the back plate of the LCD module is assembled at least by a first back plate portion and a second back plate portion, wherein at least one splice structure is defined between the first back plate portion and the second back plate portion, and the splice structure comprises a first side edge formed on the first back plate portion and a second side edge formed on the second back plate portion; and the first side edge is provided with at least one convex portion, and the second side edge is provided with at least one concave step portion, which does not pass through the second back plate portion, and shapes of the first side edge and the second side edge are correspondingly engaged with each other;

wherein a maximum width at an outer end of the convex portion is larger than a minimum width at an inner end of the convex portion;

wherein the convex portion is provided with a fixing hole thereon, and the concave step portion is correspondingly provided with a fixing pillar therein; and wherein the fixing pillar passes through the fixing hole for a distance, and after the first back plate portion is spliced with the second back plate portion, an end portion of the fixing pillar is deformed and expanded in diameter thereof to fix the fixing hole by an external force, so as to fix the first back plate portion and the second back plate portion.

2. The splice structure of the back plate of the LCD module according to claim 1, characterized in that: the shape of the convex portion and the concave step portion is an arc shape or a trapezoid shape, and the length of the convex portion is substantially equal to the width thereof.

3. The splice structure of the back plate of the LCD module according to claim 1, characterized in that: the material of the first back plate portion is zinc-plated steel plate, and the material of the second back plate portion is aluminum or alloy thereof.

4. The splice structure of the back plate of the LCD module according to claim 1, characterized in that: the material of the first back plate portion is zinc-plated steel plate, and the material of the second back plate portion is engineering plastic.

5. The splice structure of the back plate of the LCD module according to claim 1, characterized in that: the splice structure comprises a plurality of the convex portions and the concave step portions, wherein an arrangement mode of the convex portions is symmetrical or unsymmetrical type.

6. A back plate of an LCD module, characterized in that: the back plate of the LCD module is assembled at least by a first back plate portion and a second back plate portion, wherein at least one splice structure is defined between the first back plate portion and the second back plate portion, and the splice structure comprises a first side edge formed on the first back plate portion, and a second side edge formed on the second back plate portion; and the first side edge is provided with at least one convex portion, and the second side edge is provided with at least one concave step portion, which does not pass through the second back plate portion, and shapes of the first side edge and the second side edge are correspondingly engaged with each other;

wherein a maximum width at an outer end of the convex portion is larger than a minimum width at an inner end of the convex portion;

wherein the convex portion is provided with a fixing hole thereon, and the concave step portion is correspondingly provided with a fixing pillar therein; and wherein the fixing pillar passes through the fixing hole for a distance, and after the first back plate portion is spliced with the second back plate portion, an end portion of the fixing pillar is deformed and expanded in diameter thereof to fix the fixing hole by an external force, so as to fix the first back plate portion and the second back plate portion.

7. The back plate of the LCD module according to claim 6, characterized in that: the material of the first back plate portion is zinc-plated steel plate, and the material of the second back plate portion is aluminum or alloy thereof.

8. The back plate of the LCD module according to claim 6, characterized in that: the material of the first back plate portion is zinc-plated steel plate, and the material of the second back plate portion is engineering plastic.

9. The back plate of the LCD module according to claim 6, characterized in that: a splice mode of the back plate of the LCD module is symmetrical or unsymmetrical type.

10. The back plate of the LCD module according to claim 6, characterized in that: a splice mode of the back plate of the LCD module is a frame type.

11. The back plate of the LCD module according to claim 6, characterized in that: the shape of the convex portion and the concave step portion is an arc shape or a trapezoid shape, and the length of the convex portion is substantially equal to the width thereof.

12. The back plate of the LCD module according to claim 6, characterized in that: the material of the first back plate portion is zinc-plated steel plate, and the material of the second back plate portion is aluminum or alloy thereof.

13. The back plate of the LCD module according to claim 6, characterized in that: the material of the first back plate portion is zinc-plated steel plate, and the material of the second back plate portion is engineering plastic.

14. The back plate of the LCD module according to claim 6, characterized in that: the splice structure comprises a plurality of the convex portions and the concave step portions, wherein an arrangement mode of the convex portions is equidistant or non-equidistant type.

* * * * *